US012249186B2

(12) United States Patent
Borras et al.

(10) Patent No.: US 12,249,186 B2
(45) Date of Patent: Mar. 11, 2025

(54) SYSTEM AND METHOD TO PRESERVE USER'S PRIVACY IN A VEHICLE MILES TRAVELED SYSTEM

(71) Applicant: GEOTOLL, INC., Plantation, FL (US)

(72) Inventors: Jaime Andres Borras, Miramar, FL (US); Wyatt Drake Geist, Davie, FL (US)

(73) Assignee: GEOTOLL INC., Plantation, FL (US)

( * ) Notice: Subject to any disclaimer, the term of this patent is extended or adjusted under 35 U.S.C. 154(b) by 0 days.

(21) Appl. No.: 17/890,060

(22) Filed: Aug. 17, 2022

(65) Prior Publication Data

US 2023/0056836 A1 Feb. 23, 2023

Related U.S. Application Data

(60) Provisional application No. 63/234,132, filed on Aug. 17, 2021.

(51) Int. Cl.
*G07B 15/02* (2011.01)
*G06Q 30/0283* (2023.01)
*G07B 15/06* (2011.01)
*G06Q 20/38* (2012.01)

(52) U.S. Cl.
CPC ......... *G07B 15/02* (2013.01); *G06Q 30/0284* (2013.01); *G07B 15/063* (2013.01); *G06Q 20/389* (2013.01); *G06Q 2220/10* (2013.01)

(58) Field of Classification Search
CPC .. G07B 15/02; G07B 15/063; G06Q 30/0284; G06Q 20/389
USPC .................................................. 705/13, 400
See application file for complete search history.

(56) References Cited

U.S. PATENT DOCUMENTS

| 2012/0215594 A1* | 8/2012 | Gravelle | G07B 15/063 705/13 |
| 2019/0279437 A1* | 9/2019 | Borras | G06Q 50/40 |
| 2021/0287183 A1* | 9/2021 | Harris | H04W 4/022 |

FOREIGN PATENT DOCUMENTS

| KR | 2020053736 A | * | 5/2020 | ........... G06Q 20/145 |
| KR | 20200053736 A | * | 5/2020 | |
| WO | WO-2019227985 A1 | * | 12/2019 | ......... G06K 7/10366 |

OTHER PUBLICATIONS

Bart Jansen, "'Dynamic tolls': How highways can charge $40 for driving just 10 miles", Dec. 7, 2017; usatoday.com, 5 pages (Year: 2017).*

(Continued)

*Primary Examiner* — Shannon S Campbell
*Assistant Examiner* — Freda A Nelson
(74) *Attorney, Agent, or Firm* — The Concept Law Group, PA; Scott M. Garrett; Scott D. Smiley

(57) ABSTRACT

A road usage charge system uses a proprietary blockchain to conduct transactions for road usage fees. While driving, a mobile device or equivalent tracks the vehicle location, speed, time of day, day of week, and any other parameter that may be used to modify a base road use fee are tracked and applied to conditional modifiers of the smart contract to create a new transaction block. As a result, the tedious reconciliation process normally associated with vehicular payments can be avoided.

5 Claims, 12 Drawing Sheets

(56) References Cited

OTHER PUBLICATIONS

Petter Arnesen et al. "Geofencing to Enable Differentiated Road User Charging" Jul. 2021, journals.sagepub.com; Transportation Research Record vol. 2675, Issue 7, pp. 299-306 (Year: 2021).*
Keiichi Furukawa, "Blockchain turns cars into payment vehicle for drivers", Oct. 14, 2019 04:49 JST; asia.nikkei.com; 1 page. (Year: 2019).*
David Smith. "How Blockchain Can Help Toll Collection Systems", Dec. 10, 2019, statetechmagazine.com, 9 pgs. (Year: 2019).*

\* cited by examiner

SYSTEM AND METHOD TO PRESERVE USER'S PRIVACY IN A VEHICLE MILES TRAVELED SYSTEM

CROSS REFERENCE

This application claims priority to provisional application No. 63/234,132, filed Aug. 17, 2021, the entirety of which is hereby incorporated by reference.

FIELD OF THE DISCLOSURE

The present invention relates generally to a system for determining the distance driven by a vehicle, and, more particularly, relates to determining the location and time where a vehicle was driven for the purpose of assessing a road usage charge using a distributed ledger while also maintaining the privacy of the users.

BACKGROUND OF THE DISCLOSURE

It is well known that governments assess a tax on gasoline that is used to pay for roadway maintenance. Typically there are both national and subdivision jurisdictions assess taxes. These taxes are collected through the gasoline retailer and paid to the respective governmental entities. One way people avoid the gasoline tax is by driving electric vehicles, which do not operate on gasoline. The rise in popularity of electric vehicles has affected the tax collections relative to road usage. That is, the tonnage traversing roads, and therefore wearing on the roads, has steadily increased, and the revenue from gasoline tax has not kept pace. Increasing fuel efficiency of vehicles in general, as well as the popularity of electric vehicles has led to less tax being raised per unit tonnage traversing roadways. This means that as the need for maintenance has increased, the funds generated by fuel taxes have diminished relative to that need.

As a result, many jurisdictions are looking into implementing a road use charge in which drivers pay a fee for the number of miles driven by a vehicle. This raises a number of issues in implementation such as how the distance driven is tracked, how it can be used to incentivize drivers to be efficient, and charge premiums for access to congested areas. There are numerous ways in which this can be done, most of which raise privacy concerns as people are not always comfortable with the government having a record of where and when they travelled. As a result, people are extremely hesitant to accept a system where their vehicle's location is continuously reported to a governmental agency, as well as having any device in their vehicle that "tracks" their movement.

Therefore, a need exists to overcome the problems with the prior art as discussed above.

SUMMARY OF THE DISCLOSURE

In accordance with some embodiments of the inventive disclosure, there is provided a blockchain based road usage charge method that includes determining, at a vehicle, that the vehicle is moving while the vehicle is moving, in an iterative loop, determining a location of the vehicle, determining a region type for a roadway on which the vehicle is traveling by comparing the location of the vehicle to one or more geofence definitions, wherein the region type indicates a base usage rate, determining whether a surcharge condition applies and adding the surcharge if the surcharge applies, determining a distance driven on the roadway, and writing the distance driven and total of the base usage rate and surcharge in an encrypted block in a blockchain.

In accordance with a further feature, the method can determine that the vehicle is moving is performed by a mobile device based on a change of location indicated by a GPS subsystem of the mobile device while the mobile device is connected to an audio system of the vehicle.

In accordance with a further feature, the method further includes writing the MAC address of the vehicle audio system into the block.

In accordance with a further feature, the method can determine the region type comprises determining whether the vehicle is in an urban, suburban, or rural region.

In accordance with a further feature, the method can further include, at a settlement time, a VMT agency decrypting the block of the blockchain to obtain a cumulative record of distance driven, region locations, and surcharges, along with payment information, and the VMT agency processing a payment using the payment information.

In accordance with some embodiments of the inventive disclosure, there is provided a method of protecting a user's location privacy and avoiding a need for reconciliation in a VMT system that includes establishing a block in a blockchain for a vehicle, the blockchain being composed of a distributed ledger, and wherein a VMT agency can access blocks for the vehicle in order to settle VMT payment. The method further includes determining, by equipment in the vehicle, a distance driven, a classification of locations where the vehicle is driven based on pre-defined geofence definitions, and determining whether any fee modifier applies to the distance driven or portions of the distance driven. The method further includes writing into the block, by the equipment in the vehicle, the distance driven and any fee modifiers that apply, wherein the total distance driven and the fee modifiers for portions of the distance driven are used by the VMT agency to determine a total VMT fee.

In accordance with some embodiments of the inventive disclosure, there is provided fee modifier for congestion in a VMT system, that includes defining a plurality of geofence definitions, each one of the geofence definitions being defined over a unique portion of a roadway, storing the plurality of geofence definition in association with a data center that is accessed by a plurality of remotely located in-vehicle device that are each one of a mobile device or a connected vehicle system, determining a number of requests for a given one of the plurality of geofence definitions, and determining a fee modifier for the one of the plurality of geofence definitions based on the number of requests for the one of the plurality of geofenced definitions.

In accordance with some embodiments of the inventive disclosure, there is provided method of optimizing location accuracy for VMT operation that includes providing a vehicle having a connected vehicle system that includes a satellite location receiver, providing, in the vehicle, a mobile device having a satellite location receiver, establishing a communication link between the mobile device and the connected vehicle system. Each of the satellite locations receivers of the connected vehicle system and the mobile device performing a location fix operation to determine a radius of error, and selecting the satellite location receiver having the smaller radius of error to perform geofence definition comparisons in a VMT operation.

In accordance with some embodiments of the inventive disclosure, there is provided a method for optimizing location accuracy for VMT operation that includes, at a mobile device which is running a VMT application program, detecting a connected vehicle API, and the mobile device connecting to the connected vehicle API and obtaining a vehicle identifier, an odometer reading. The method further includes the mobile device initiating a new block for the vehicle in a blockchain including the vehicle identifier and odometer reading. The method further includes the mobile device selecting one of a satellite location receiver of the vehicle or a satellite location receiver of the mobile device, and using the selected satellite location receiver to obtain periodic location fix data that is compared to geofence definitions of roadways in order to determine a roadway being travelled and a VMT fee rate to be applied to distance travelled on the roadway.

In accordance with a further feature, the method can include selecting one of the satellite location receiver of the vehicle or the satellite location receiver of the mobile device is performed based one whichever has a smaller location determination error.

Although the invention is illustrated and described herein as embodied in a system and method to preserve privacy in a VMT system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The figures of the appendix serve to further illustrate various embodiments and explain various principles and advantages all in accordance with the present invention.

DETAILED DESCRIPTION

While the appendix shows and describes the various drawing contained therein, the following additional discussion is provided to further explain the embodiments. It is to be understood that the disclosed embodiments are merely exemplary of the invention, which can be embodied in various forms.

Figure 1:
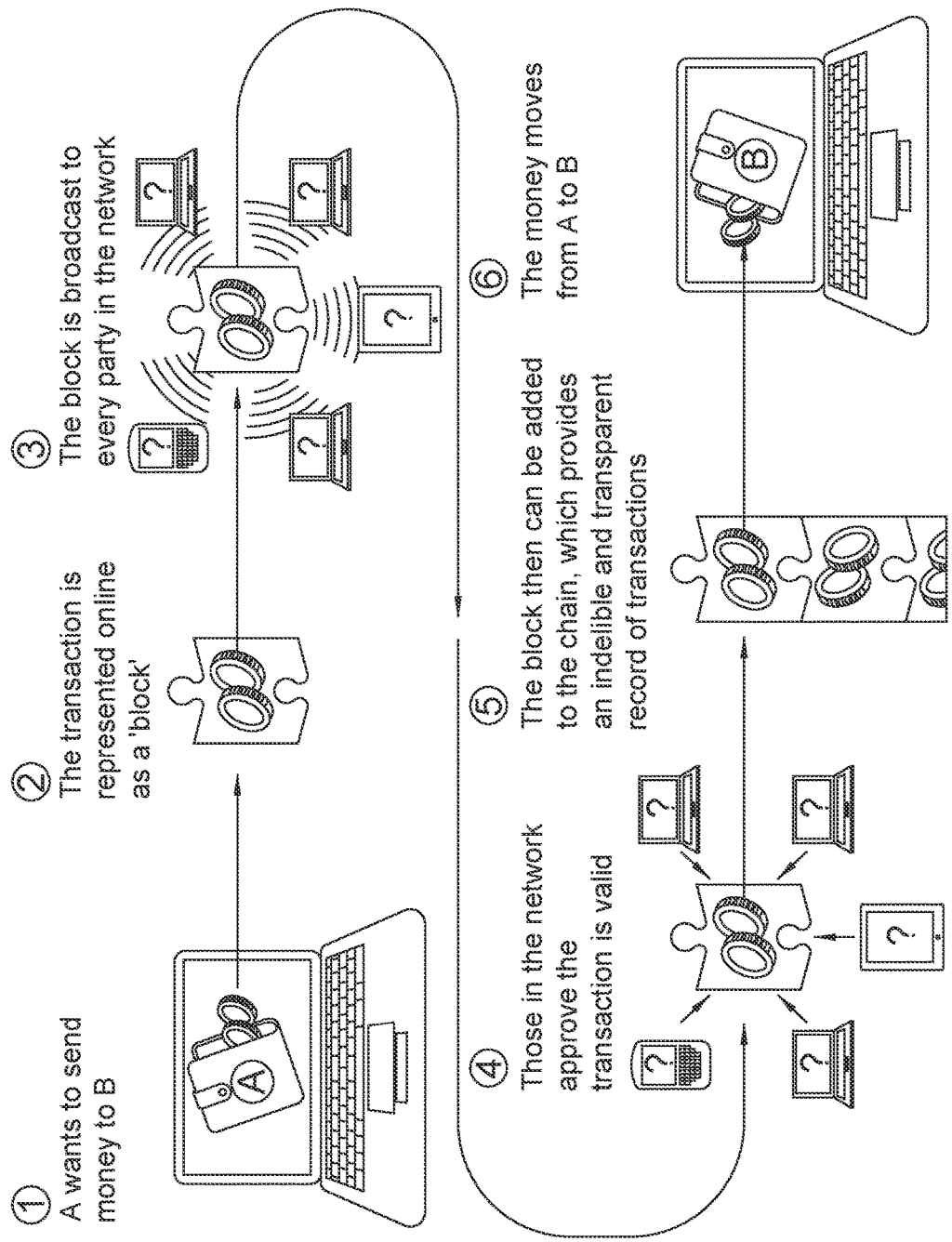
FIG. 1 shows a prior art block chain technology.

FIG. 1 shows a prior art block chain technology. In general, at 1 a first user wants to send money to a second user or some other entity. Each entity has a digital wallet that is assigned unique wallet address, A transaction is logged in the distributed ledger of the blockchain indicating an amount of money from the first user to the second user's digital wallet. To verify this, at 2 a block is created with details of the transaction. In 3 all of the parties on the blockchain network have their copies of the distributed ledger updated with transaction. In 4 entities prove the transaction by a mining operation, which indicates the transaction is valid, and the distributed ledgers are then updated accordingly in 5, and in 6 the receiving entity is credited with the funds in their digital wallet. This is a rough overview of a basic blockchain system.

Figure 2:
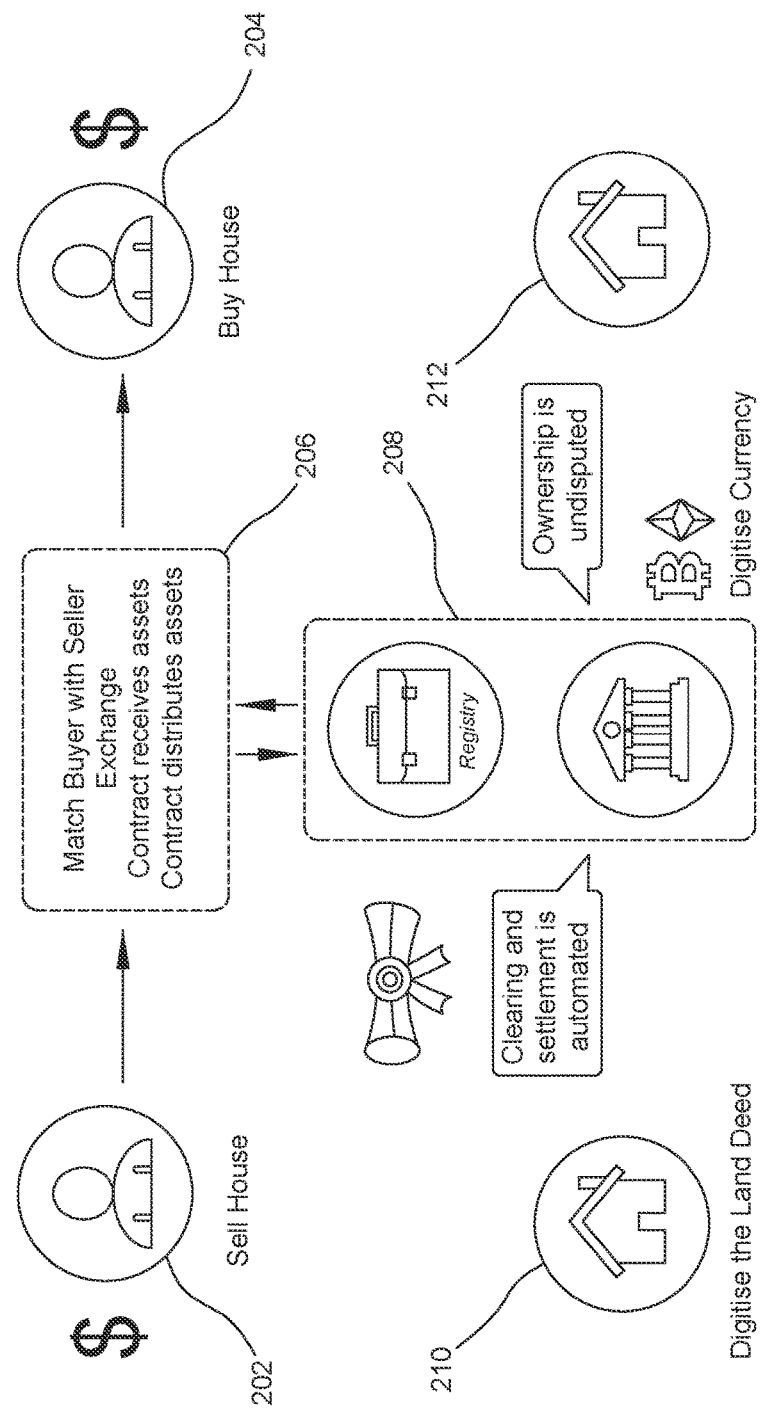
FIG. 2 shows an example of a smart contract in a block chain in accordance with the prior art.

FIG. 2 shows an application of a smart contract in a blockchain system 200, in accordance with the prior art. The blockchain system can be, for example, the Ethereum network. Briefly, a homeowner 202 wants to sell their house to a buyer 204. A smart contract 206 on a blockchain network is created that sets out the conditions for the sale. Documents and funds are tracked through a registry entity 208 that determines which conditions have been met in an automated process. Once all the conditions of the smart contract 206 are met, the completed status of the smart contract is verified by the blockchain network and added to the distributed ledger, and the deed to the property can be digitized 210, and thereafter the property 212 is owned by the buyer 204. Thus, smart contracts can be used to automate the verification of transactions that have conditions.

Figure 3:
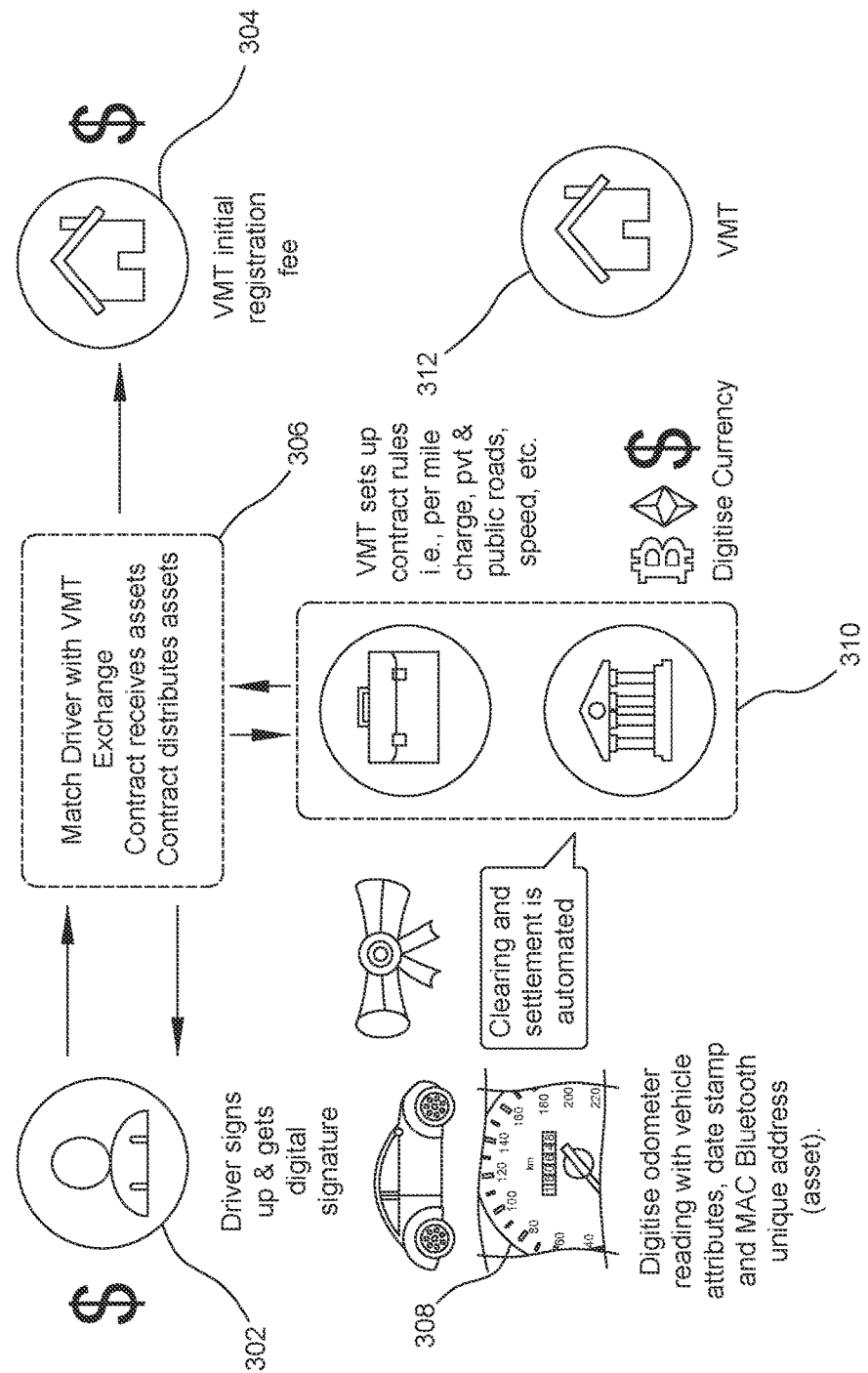
FIG. 3 shows an example of a Vehicle Miles Travelled (VMT) system registration using a smart contract in a block chain system, including an example of how payment is made in the inventive system using a smart contract in a block chain system, in accordance with some embodiments.

FIG. 3 shows an overview of a process of using smart contracts for a Vehicle Miles Travelled (VMT) payment system, in accordance with some embodiments. A VMT system allows vehicle operators to pay a tax based on vehicle usage, and specifically based on miles driven on public roads, as a supplement or alternative to taxes on fuel. The first step to using the system is for a user 302 to register a vehicle 308 with a VMT payment processor (VMTPP) 312 and pay an initial registration fee 304. The mileage of the vehicle is proven, such as by taking a picture of the odometer using the mobile device while the mobile device is also paired with the audio system of the vehicle. This can be done through an application program for a VMTPP that is installed on a mobile device. The user 302 can set up an account with the VMTPP, which is essentially a blockchain wallet that is accessible by one or more VMT agencies. A smart contract 306 is then set up that corresponds to a particular vehicle 308. In order to verify the mileage on the vehicle at registration time, the user turns on the vehicle 308, which allows the user's mobile device to connect with the audio system of the vehicle using BlueTooth, for example. The application program, once it detects the connection to the vehicle's audio system, then prompts the user to take an image of the vehicle odometer while the connection is maintained. In more sophisticated vehicles, the vehicle will have a user-accessible computing interface that will allow the user to install application programs that can be run/executed by the vehicle computing system and directly obtain the mileage reading. In some embodiments the user's mobile device can interact with the vehicle computing system to obtain mileage information from the vehicle computing system. In some embodiments the vehicle will also have its own mobile communication system, obviating the need to use a handheld mobile device, and the vehicle computing system can directly communicate with the VMTPP 304 and conduct the registration. The registration process includes establishing an encrypted smart contract 306 that establishes the rules and fees applied to the roadways travelled by the vehicle 308. The cryptographic key for decrypting the smart contract 306 can be shared by the user with the VMTPP and changed periodically for security. The smart contract 306 can also include payment information that the VMTPP can use to collect payment (e.g. credit card information). The smart contract includes various rules 310 for calculating the payment owed, when payments are made, and so on, as will be described in more detail subsequently herein. Once the rules are satisfied, or otherwise trigger a payment, then the VMTPP 312 processes payment and the transaction is recorded on the blockchain. The contract rules are provided to the smart contract 306 by the VMTPP 312, and can be provided to the user 302 before the user agrees to the smart contract. Periodically the user can report miles driven, where those miles were driven, time of day, and any other conditions that may affect the calculation of the amount owed. The reporting is done by the mobile phone application, which can track location, distance driven, time of day, day of the week, and so on, and that data can be supplied as an input or asset of the smart contract 306.

Figure 4A:
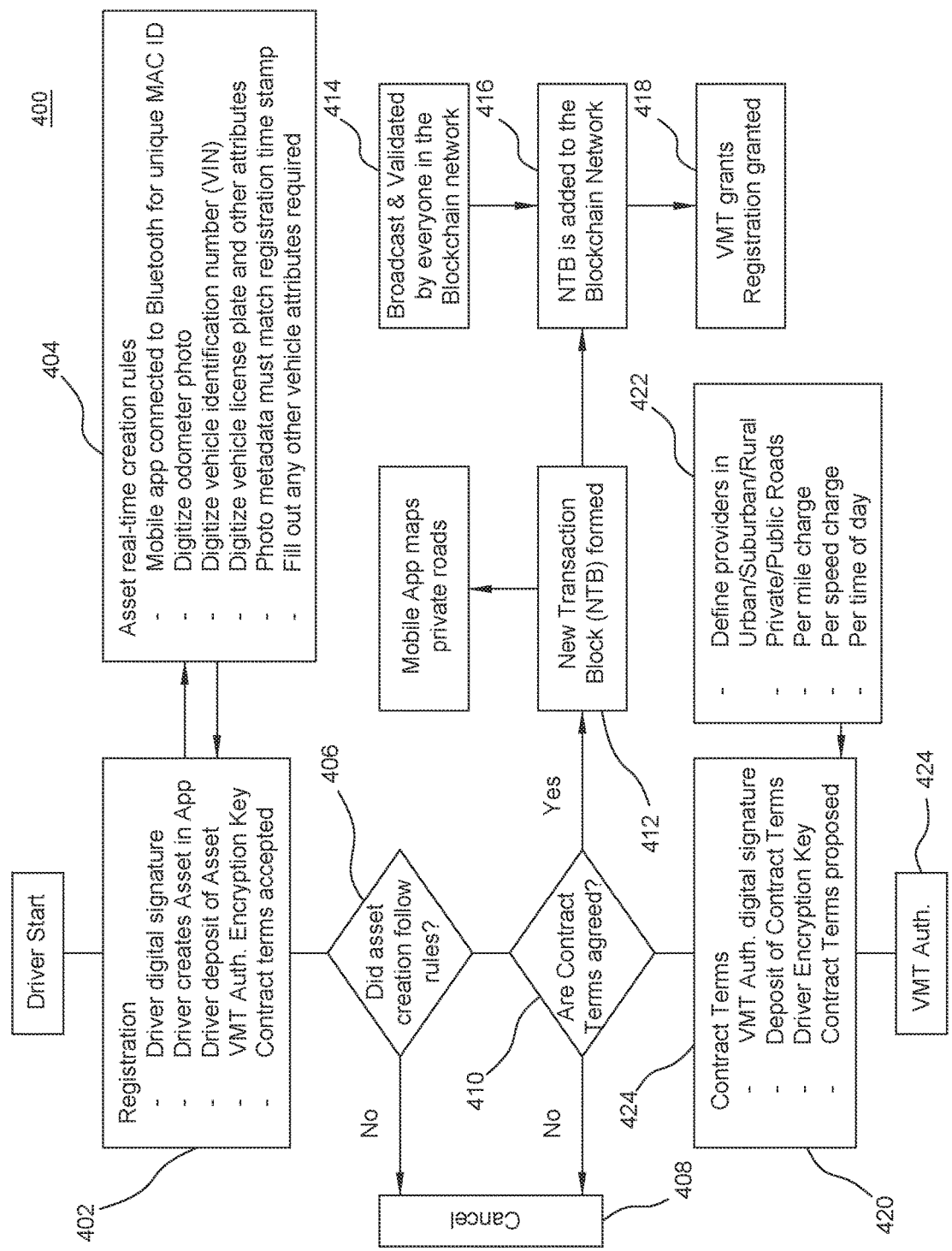
FIG. 4A shows a registration flowchart illustrating, in finer detail, the process of FIG. 3.
Figure 4B:
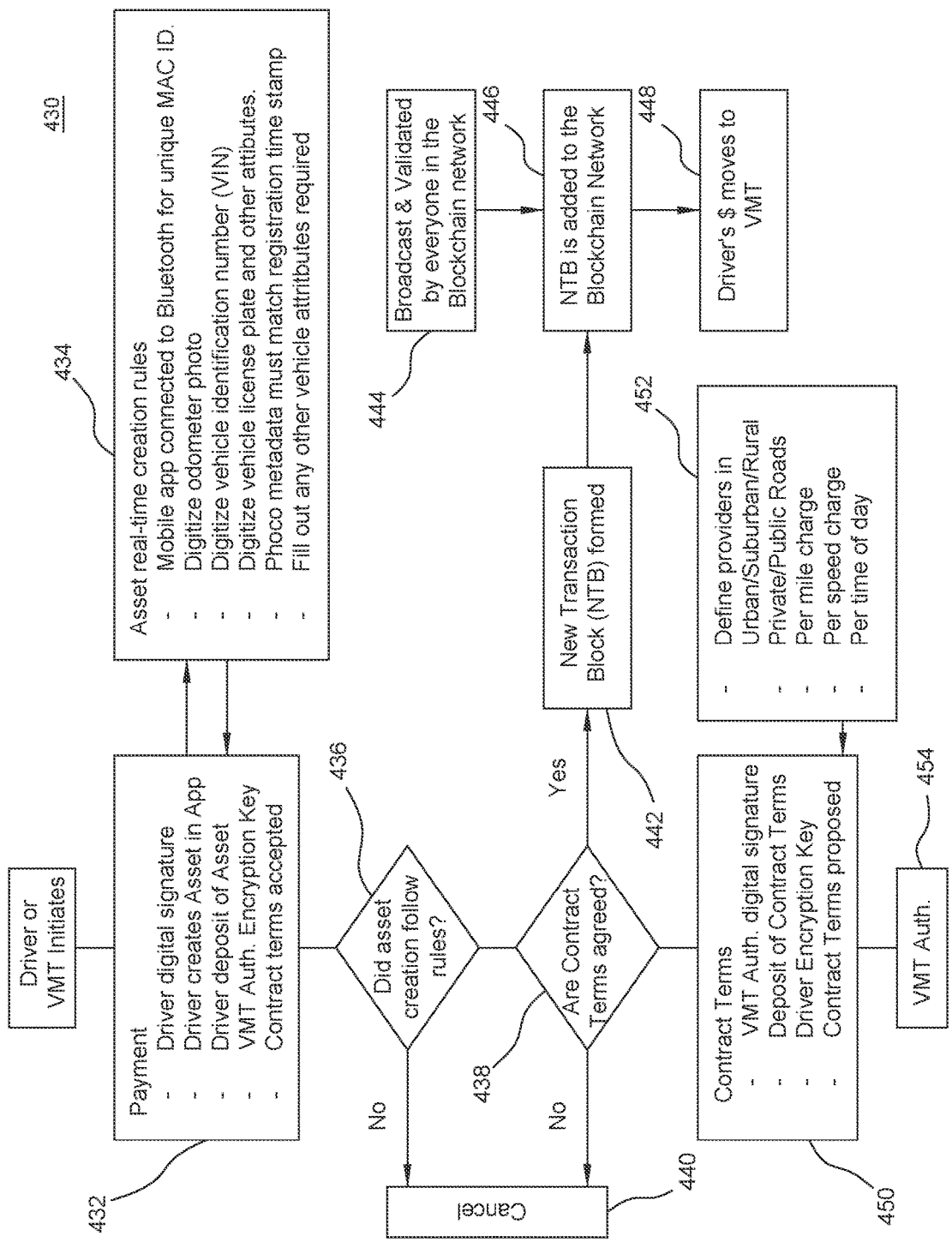
FIG. 4B shows a payment flowchart illustrating, in finer detail, the process of FIG. 3.

For a payment transaction the process of FIG. 4B is followed, but briefly, with further reference to FIG. 3, the process is carried out periodically and can be driven by either the user or the VMTPP. Periodically the VMTPP can send a request for reconciliation, or the user's mobile device can periodically provide miles driven information (distance, location, time, etc.). In general, every time a user pays the assessed fee a new transaction block is created as a record. The new transaction block is appended to the user's most recent block. Thus, the first transaction block will be appended to the user's registration block. The distance driven, where (e.g. classification), time when driven, and any other parameter that may affect the fee assessed or which may adjust or exempt a fee is included. As the user drives, either the user's mobile device can relay location information to a third party that is then compared to geofenced street/road regions, the user's mobile device can perform this function locally at the mobile device, or the vehicle computing system can perform this task. The third party can be a toll facilitator that has mapped out geofenced regions to define the various roadways as toll roads, urban road, suburban roads, rural roads, private roads, and special conditions that may apply to any of them such as time of day adjustments, congestion adjustments, high occupancy vehicle adjustments, and so on. Accordingly, a record is maintained of what type of roadways have been driven, the distance driven for each of them, and the resulting total VMT assessment. Then the new transaction block is created and authenticated using mining operations to verify the block, and funds are transferred to pay the amount due.

FIG. 4A shows a flow chart diagram of a method 400 for registering a vehicle for VMT payment, in accordance with some embodiments. In the initial registration 402 a user or driver provides or creates a digital signature, an asset in the application program of the user's mobile device that will correspond to the particular vehicle being registered, and a deposit of funds or payment information to allow funds to be transferred. In step 404, the asset creation can include connecting the mobile device to the vehicle audio system, which allows the mobile device to obtain the media access controller (MAC) address of the vehicle audio system. The MAC address is a unique identifier that is hard coded in the audio system's wireless transceiver. The odometer, vehicle identification number (VIN), and license plate can both be photographed with the mobile device while it is in wireless communication or linked with the vehicle audio system. The mobile device can also generate a VMT authorization encryption key in step 402. Then the asset (the collection of vehicle data and images) is transferred to the VMT agency or VMTPP for evaluation. In step 406 the VMT authority evaluates the data to ensure all of the rules have been followed. If not, then the registration is cancelled (408) and a deficiency notice can be transmitted back to the mobile device for rectification by the user. In step 410 the VMT authority determines if the contract terms have been properly assented to, and if not then the process is cancelled (408) and a deficiency notice can be sent back to the user's mobile device. If the asset creation rules are followed, and the contract terms are agreed to, then in step 412 the VMT authority can create a new transaction block for the vehicle. This is essentially the start of an account on the system blockchain. The mobile application on the user's mobile device can then start tracking the movement of the vehicle on a map provided by a navigation program, or by using defined geofence regions used by a tolling service to identify roads. In step 414 the new transaction block is processed by the blockchain and provided to all entities holding a copy of the distributed ledger, and in step 416 the new transaction block is added to the blockchain network and in step 418 the vehicle registration in the VMT blockchain system is granted, meaning the user is notified by sending a message to the user's mobile device.

Returning to step 410, the contract terms are agreed to in step 420 by receiving the terms from the VMT authority in step 422. The terms define rates for various locales, such as urban, suburban, and rural regions which indicate the rate per distance driven, and any modifiers such as speed or time of day modifiers that can modify the rate charged. In step 420 the contract terms are collected and signed using the user's cryptographic key and the VMT authority's cryptographic key (provided in step 424). This information is added to the new transaction block in step 412.

In FIG. 4B there is shown a flowchart diagram of a method 430 for payment of a VMT fee, using a blockchain, in accordance with some embodiments. The method 430 also expands on that discussed briefly in reference to FIG. 3. In step 432, the user of the vehicle must again create an asset or asset file, substantially as in step 404. The asset is digitally signed by the user's mobile device by applying the user's cryptographic key, indicating that contract terms are accepted. Steps 436, 438, and 440 are processed substantially the same as steps 406, 410, 408, respectively. In steps 450, 452, and 454 the VMT authority provides, for example, the rates to be applied to distance driven under various conditions and locations, and the user/driver and VMT authority both sign the contract terms with their respective cryptographic keys to form a new transaction block in step 442. In step 444 the new block is then added to the distributed ledger of the blockchain network and validated, then in step 446 the block is recorded as being validated. In step 448, since the smart contract has been satisfied, funds are paid to the VMT authority.

Figure 5:
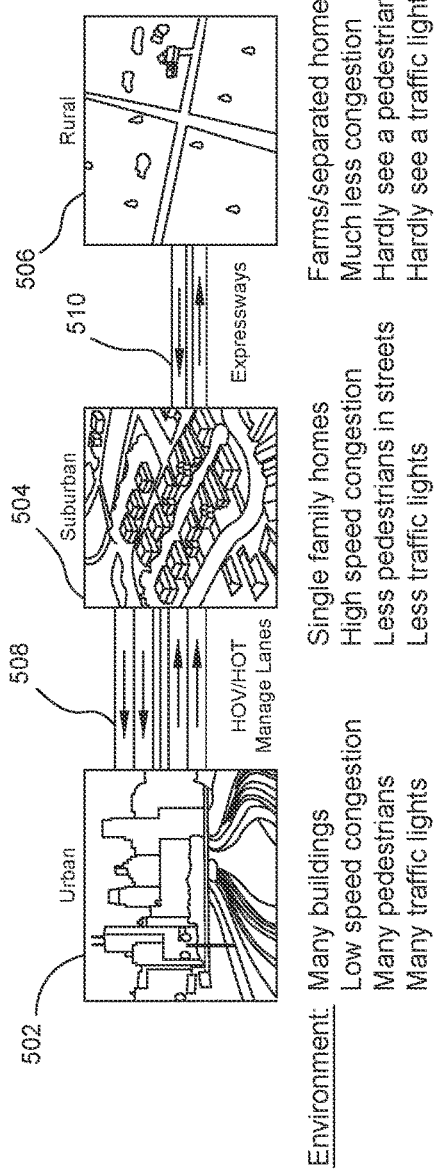
FIG. 5 shows a table including examples of how the fee charged for road usage by a vehicle can be varied based on road type, location, the time of day, and other factors.

In FIG. 5 of the appendix a table is shown in which differing rates are applied to roadways based on the type of roadway as well as the conditions (e.g. time of day, congestion relief) that may increase the fee over the basic fee. Three types of regions are shown as well, urban 502, suburban 504, and rural 506. Each of these regions can have a different base rate, or different surcharges, or both. In urban and suburban regions there can be toll roads such as high occupancy lanes 508 in roads that allow people to use less congested lanes for a fee. In between rural and suburban regions there are expressways 510 that can require a toll, on additional to standard miles driven charges. The various types of roadways 508, 510 can have different charges applied, based on location. Table 512 shows examples of how rates can vary based on location, time of day, and day of the week. Other rate modifiers can be used as well, such as, for example, a surcharge for heavy vehicles, or a discount for light vehicles or motorcycles.

Figure 6:
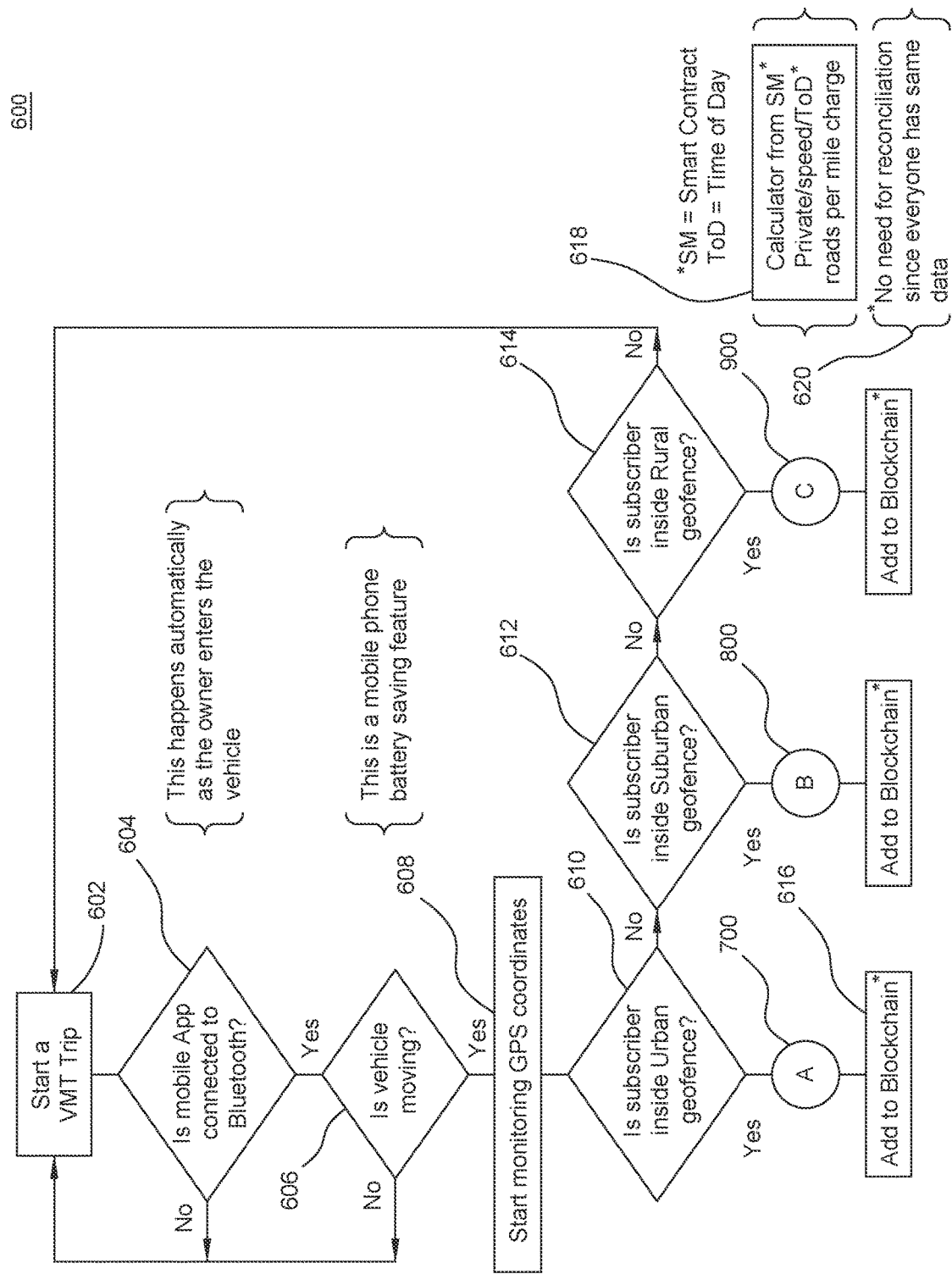
FIG. 6 shows a flowchart of a method for initiating a trip that is monitored for VMT fee assessment, in accordance with some embodiments.

In FIG. 6 a flow chart diagram is shown for a method 600 of determining which the type of region a driver is in using geofence definitions. At the start 602 the driver may ensure that the mobile phone application is running in order to track distance driven as well as other relevant factors that can modify the rate charged. In step 604 the mobile device determines if it is connected to the vehicle audio system by, for example, a wireless networking link. In step 606 the mobile device, using location tracking, can determine whether the vehicle is moving. Once the vehicle starts moving, then location coordinates can be collected in step 608, and then evaluated based on geofence definitions. In steps 610, 612, and 614 the method 600 applies the location to geofence definitions to determine whether the vehicle is in an urban geofence (610), a suburban geofence (612), or a rural geofence (614). If any of these apply, then a corresponding rate charge determination method 700, 800, or 900 is followed, respectively. As indicated in step 618, based on the smart contract, the road type (public/private), speed, time of day, and distance driven can be used in each of the methods 700, 800, 900. Once the proper method 700, 800, or 900 is conducted, then a block is added for the vehicle to the blockchain and funds can then be transmitted accordingly, as in step 616 (which is identical for methods 800 and 900). As indicated in section 620, the benefit this process is that the need for conventional reconciliation is avoided as the data is verified via the blockchain.

Figure 7:
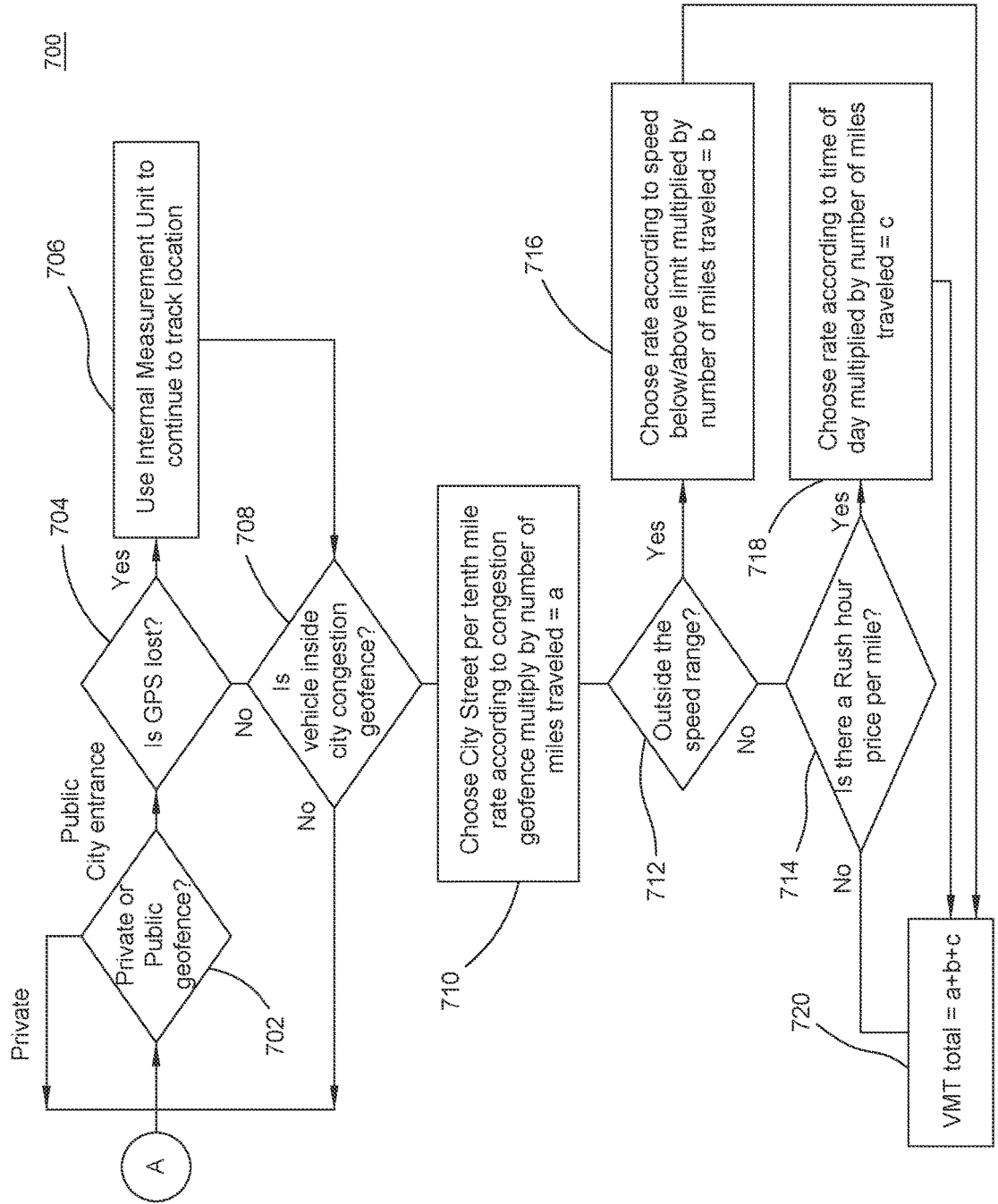
FIG. 7 shows a flowchart diagram of a method for operating the VMT fee assessment in an urban locale, in accordance with some embodiments.

FIG. 7 shows a flowchart diagram of a method 700 for determining an applicable VMT rate when the vehicle is in an urban locale, in accordance with some embodiments. If the answer to step 610 is "yes," then this method 700 is followed. In step 702 the mobile device determines whether the vehicle is on a public or private road. If the vehicle is on a private road, then no charge is applied. Once the vehicle enters a public road then in step 704 the location is tracked using, for example, GPS coordinates produced by the on-board GPS receiver of the mobile device (or that in the vehicle for more advanced vehicles). If the GPS signal is lost, then in step 706 inertial tracking can be used, such as by a multi-axis accelerometer in the mobile device. In step 708 the method 700 determines if the vehicle is also in a congestion zone, if yes, then a multiplier "a" is used in step 710. Then in steps 712, 714 the method determines whether the vehicle is driven within an allowed speed range, and if the vehicle speed is outside of the speed range a factor "b" is applied in step 716. If in step 714 the vehicle is driving during a high congestion time (e.g. "rush hour"), then a factor "c" is applied in step 718. In step 720 the factors "a," "b," and "c" are summed if they are to be applied to a base rate, and the modified rate is thereby determined.

Figure 8:
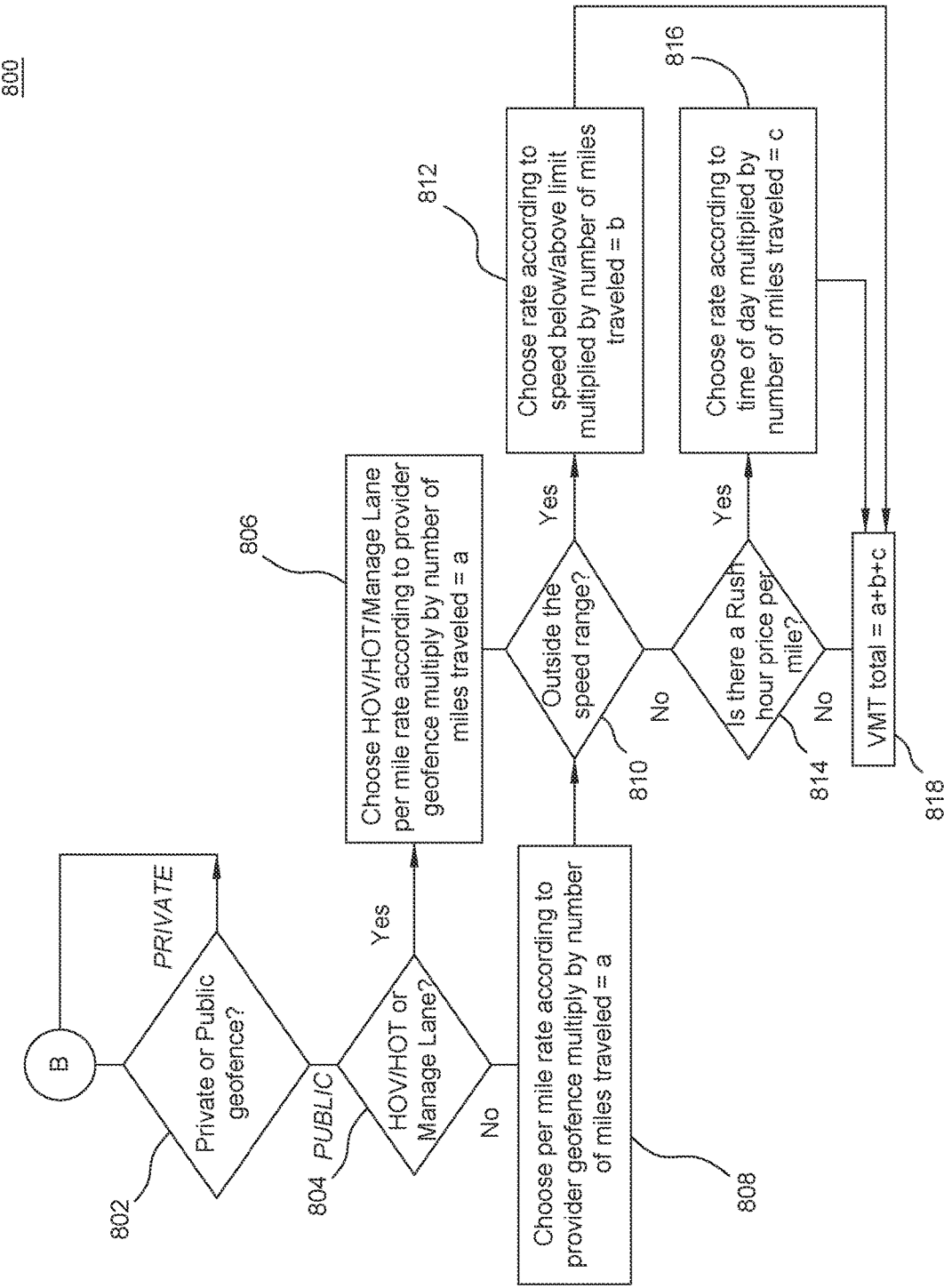
FIG. 8 shows a flowchart diagram of a method for operating the VMT fee assessment in a suburban locale, in accordance with some embodiments.

In FIG. 8 there is shown a flowchart diagram of a method 800 for determining an applicable VMT rate when the vehicle is in an urban locale, in accordance with some embodiments. If the answer to step 612 is "yes," then this method 800 is followed. In step 802 the mobile device determines whether the vehicle is in a public or private roadway. VMT charges only apply when the vehicle is driven on public roads. In step 804 it is determined whether the vehicle is on a restricted lane, such as for HOV use. If yes, then in step 806 a toll factor "a" is used. If not, then in step 808 the factor "a" is based on a base rate corresponding to the geofenced region in which the vehicle is located. Then in steps 810 and 814 the method determines whether the vehicle is within a predefined speed range, and whether the time of day indicates, for example, and rush hour charge. In steps 812 and 816 factors "b" and "c" are added to the calculation if their respective decision steps are affirmative. In step 818 the applicable factors are summed and applied to modify the base rate which is applied to the distance driven.

Figure 9:
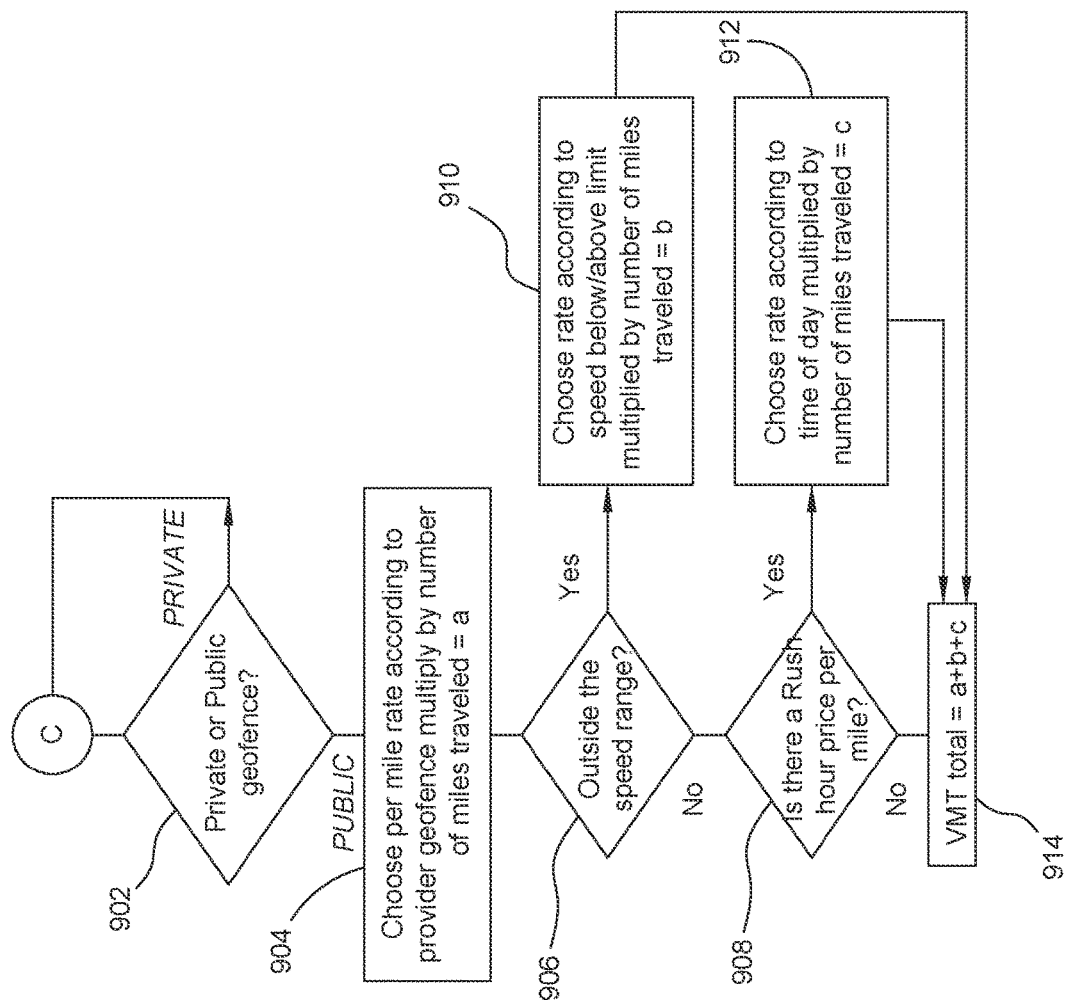
FIG. 9 shows a flowchart diagram of a method for operating the VMT fee assessment in a rural locale, in accordance with some embodiments.

In FIG. 9 there is shown a flowchart diagram of a method 900 for determining an applicable VMT rate when the vehicle is in an urban locale, in accordance with some embodiments. If the answer to step 614 is "yes," then this method 900 is followed. Step 902 ensures charges are only applied if the vehicle is on public roads. In step 904 the base rate "a" for rural roads is determined, and in steps 906 and 908 the speed and time of day factors "b" and "c," respectively are applied in steps 910, 912, if applicable. In step 914 the factors are summed and applied to the distance units driven to determine the VMT charge.

In each of methods 700, 800, 900, the VMT charge is determined upon the vehicle turning off (e.g. loss of connection to the vehicle audio system and the mobile device is not moving). But a partial VMT charge can also be determined when leaving one region for another, or when any of the factor change, such as the vehicle entering a HOV lane, or being driving when rush hour starts. These partial charges are accumulated and summed when the vehicle is no longer being driven.

Figure 10:
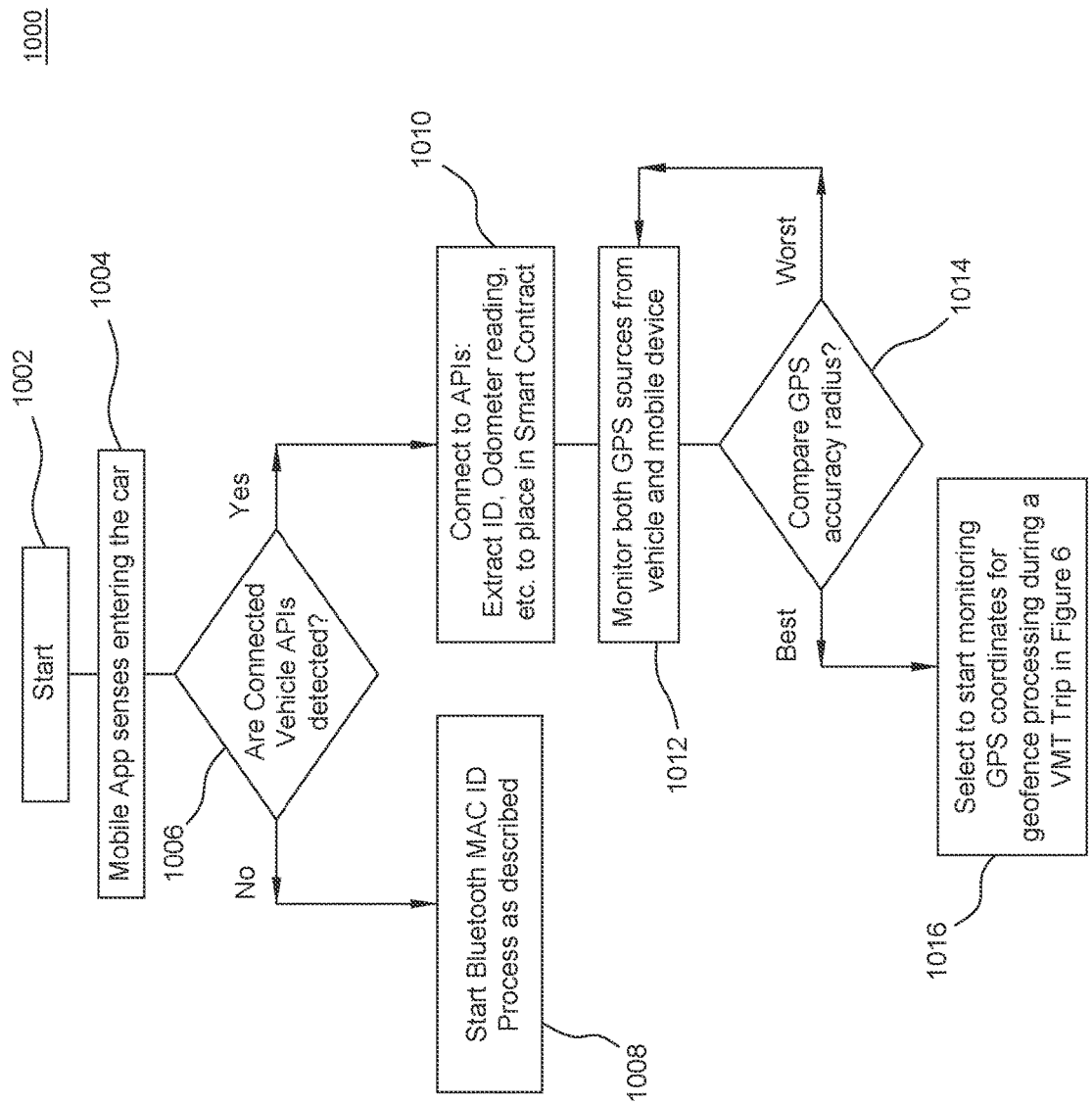
FIG. 10 shows a flowchart diagram of a method for initiating a VMT logging session, in accordance with some embodiments.

FIG. 10 shows a flowchart diagram for a method 1000 for initiating a VMT logging session, in accordance with some embodiments. Specifically, the method 1000 determine whether to use the mobile device's GPS receiver, or connect the vehicle's computer using an application program interface (API). In step 1002 the mobile device is turned on and operating. In step 1004 the mobile device automatically determines that it is in a vehicle. In step 1006 a determination is made whether the vehicle has an API. If not, then in step 1008 the mobile device tracks distance driven, location, time of day, speed, etc., as described. In step 1010, if the vehicle has an API available, such as over a WiFi link provided by the vehicle, then the mobile device can obtain odometer, speed, vehicle ID, and other relevant information from the vehicle directly. In step 1012 the mobile device can monitor both its own GPS receiver and that of the vehicle to determine whether there are errors in location as indicated in steps 1012, and 1014. If the vehicle's GPS accuracy radius is better than that of the mobile device, then the vehicle's GPS receiver output is used. In step 1016, monitoring using the vehicle's GPS receiver is used for method 600 (and 700/800/900).

Figure 11:
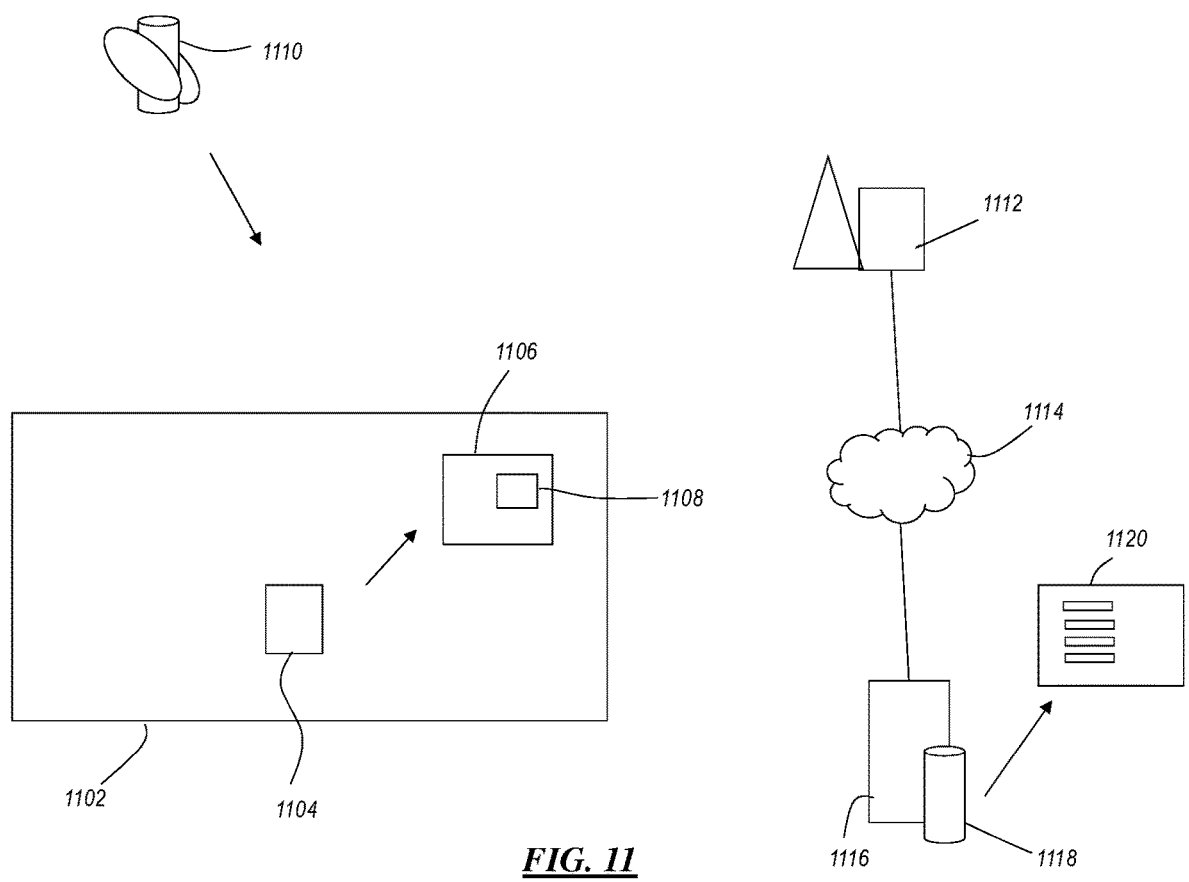
FIG. 11 shows a block schematic diagram of system including a mobile device and vehicle that use a blockchain VMT payment system.

FIG. 11 shows a block schematic diagram of system including a mobile device and vehicle that use a blockchain VMT payment system. A vehicle 1102 includes a vehicle system 1106 that can include a computer and an audio system. The vehicle system provides a wireless communication networking interface that allows a mobile device 1104 to wirelessly connect to the vehicle system 1106. The mobile device 1104 can be a conventional smartphone device that includes a cellular transceiver, and one or more local wireless networking transceivers, as well as a GPS receiver. The mobile device runs an application program that causes the processor and other hardware of the mobile device to take certain actions, and described hereinabove. The vehicle system 1106 also includes a GPS receiver 1108 that may or may not be more accurate than the GPS receiver of the mobile device 1104. Both the GPS receiver of the mobile device 1104 and the GPS receiver of the vehicle system 1108 receive signals from several GPS satellites 1110 that are in view overhead, and use those signals to determine the location of the GPS receiver on the Earth. Each of the GPS receivers can have a different accuracy, which can be determined by the GPS receiver by comparing successive location fix coordinates. Once the mobile device 1104 connects to the vehicle system 1104, if the vehicle system 1106 is in compliance with the "connected car" standard, which allows access to the vehicle data, then the mobile device can determine which GPS receiver is more accurate and use the more accurate GPS receiver for location information.

The mobile device 1104 can communicate with a cellular or mobile data infrastructure, such as a base station 1112, and through the cellular infrastructure, connect over the internet 1114 to a server 1116 that is coupled to a database 1118 in which geofence definitions 1120 are stored. The mobile device 1104 can therefore access the geofence definitions 1120 to determine which geofenced region the vehicle is presently located, as well as sub-divisions of a geofenced region. For example, the vehicle 1102 may be in a city geofence, which can be quite large. In addition, the vehicle can be within a geofence defined over a freeway within the city, and further, within a geofence defined over a high occupancy vehicle lane. Each one of these geofences can have a rate or rate modifier associated with them, and are all applied to a base rate, which can be further modified based on time of day, day of week, and other modifiers.

The disclosed invention provides numerous benefits over other proposals for VMT. In particular, the technological solution used protects the driver's privacy. Rather than, for example, a tracking system that allows a third party to know where a vehicle has been driven, only the distance driven, and the applicable fee modifiers are known, if even that is made available to the VMT agency. Rather, the user's equipment, possibly in conjunction with a third party back-end or data center, verifies the distance driven and the fee modifiers that apply and put this information into a block to be verified. Where the user has travelled is not recorded. The user can make this an option on their own equipment to verify that the equipment is accurately calculating the distance travelled and the fee modifiers that may apply, but it need not be made available to anyone else.

The invention also provides the benefit of eliminating the need for reconciliation. Reconciliation occurs when a vehicle passes a toll point but is not initially identified by the RFID toll tag, and a license plate image must be used. Often this requires manual review, despite advances in image and optical character recognition technology. As a result, it can take weeks to identify a vehicle, issue an invoice, and then receive payment. While this is an ongoing problem with toll roadways, the effect would be massively multiplied such systems were expanded to cover all roads for VMT fees. By keeping the distance travelled in a block associated with vehicle, the payment due is readily determined, avoiding the need for reconciliation.

Another benefit of the invention is unique dynamic pricing algorithm in which the incidence of vehicles entering geofenced regions can be used to determine congestion, and associated fee modifiers. Further, the system can identify congested areas and make others aware of these areas so that alternative routes can be taken to avoid the congestion and the increased congestion fee modifier. Thus, the system provides for dynamic real time pricing in response to congestion.

Still another benefit of the invention is the unique feature of the system to be able to choose the most accurate GPS data, either from the mobile device or the connected/autonomous vehicle, in cases where both are available. By monitoring telematics data from the connected vehicle API the application on a mobile device, for example, can determine which of the two local systems produces the smallest radius of error in GPS location fixes. Selecting the more accurate GPS system reduces errors in identifying when a vehicle is within or outside of a given geofence region, as shown in FIG. 11. Furthermore, having the ability to select from two different GPS sources provide concurrent redundancy that resolves specific GPS precision challenges arising from poor satellite coverage, jamming, spoofing, underpass obstructions, faulty equipment, different GPS modules or platforms accuracy, etc.

What is claimed is:

1. A blockchain based road usage charge method, comprising:
   creating a registration block in blockchain for a vehicle by a mobile device including:
      the mobile device connecting to the vehicle via a wireless network interface;
      while connected to the vehicle, and responsive to being connected to the vehicle, receiving at the mobile device vehicle identification information and an initial odometer reading of the vehicle;
      the mobile device transmitting the vehicle identification information, the initial odometer reading, and a unique cryptographic key to a server of a vehicle miles travelled (VMT) agency;
      the mobile device thereafter receiving approval from the server to create the registration block;
   subsequent to creating the registration block, while the mobile device is connected to the vehicle and responsive to being connected to the vehicle via the wireless networking interface:
      determining, by the mobile device, that the vehicle is moving;
      while the vehicle is moving, in an iterative repeating loop, the mobile device:
         determining a location of the vehicle;
         determining a region type for a roadway on which the vehicle is traveling by comparing the location of the vehicle to one or more geofence definitions, wherein each of the geofence definitions indicates the region type for the roadway and the region type indicates a base usage rate;
         determining whether a surcharge condition applies and adding the surcharge if the surcharge applies;
         determining a distance driven on the roadway;
         determining whether the mobile device is still connected to the vehicle; and
      responsive to the mobile device determining that it is no longer connected to the vehicle, the mobile device writing the distance driven and total of the base usage rate and surcharge in an encrypted block in the blockchain that is appended to the registration block;
   at a settlement time, a vehicle miles travelled (VMT) agency decrypting the block of the blockchain using the unique cryptographic key provided to the server of the VMT agency to obtain a cumulative record of distance driven, region locations, and surcharges, along with payment information; and
   the server of the VMT agency processing a payment using the payment information.

2. The method of claim 1, wherein determining that the vehicle is moving is performed by a mobile device based on a change of location indicated by a GPS subsystem of the mobile device while the mobile device is connected to an audio system of the vehicle.

3. The method of claim 1, further comprises writing a MAC address of a vehicle audio system of the vehicle into the encrypted block.

4. The method of claim 1, wherein the region type indicated by each geofence definition of the plurality of geofence definitions is one of an urban, suburban, or rural region type.

5. A method of protecting a user's location privacy and avoiding a need for reconciliation in a vehicle miles travelled (VMT) system, comprising:
   establishing a registration block in a blockchain for a vehicle, the blockchain composed of a distributed ledger, and wherein a VMT agency can access blocks for the vehicle in order to settle a VMT payment, wherein establishing the registration block includes:
      equipment in the vehicle, obtaining from the vehicle, vehicle identification information and an initial odometer reading of the vehicle;
      the equipment in the vehicle transmitting the vehicle identification information, the initial odometer reading, and a unique cryptographic key to a server of a vehicle miles travelled (VMT) agency;
      the equipment in the vehicle thereafter receiving approval from the server to create the registration block and writing, via a network connection, the registration block in a distributed ledger that identifies the vehicle;
   subsequent to creating the registration block:
      determining, by the equipment in the vehicle, a distance driven by the vehicle by periodically determining locations of the vehicle via a satellite positioning receiver and determining distances between the locations, and responsive to determining each location, determining a classification of each location where the vehicle is driven by comparing each of the locations to pre-defined geofence definitions and determining distances driven in each of the geofenced definitions, and determining whether any fee modifier applies to the distance driven or portions of the distance driven in each of the geofenced regions; and
      responsive to the equipment in the vehicle determining the classification of locations where the vehicle is driven and the fee modifiers, writing into a block that is appended to the registration block, by the equipment in the vehicle, using the unique cryptographic key, the distance driven and any fee modifiers that apply;

wherein the total distance driven and the fee modifiers for portions of the distance driven are acquired by the VMT agency by decrypting the block using the cryptographic key provided to the server of the VMT agency and then used by the server of the VMT agency to determine a total VMT fee.

* * * * *